US006318265B1

(12) United States Patent
Sobel et al.

(10) Patent No.: US 6,318,265 B1
(45) Date of Patent: Nov. 20, 2001

(54) INKING SYSTEM INCLUDING REUSABLE PAPER AND WATER-HUMECTANT INK

(75) Inventors: Irwin Sobel, Menlo Park; An-Chung R Lin, Cupertino, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/493,515

(22) Filed: Jan. 28, 2000

(51) Int. Cl.[7] .............................. C09D 11/10; B41J 2/17

(52) U.S. Cl. .......................... 101/483; 347/98; 347/102; 106/31.13; 106/31.14; 106/31.01

(58) Field of Search ......................... 101/483; 106/31.46, 106/31.13, 31.14, 31.01, 31.05, 31.23, 32.5; 347/102, 98

(56) References Cited

U.S. PATENT DOCUMENTS 3,846,141 * 11/1974 Ostergren et al. ................ 106/31.01
4,259,675 * 3/1981 Mansukhanl ........................ 106/31.5
5,929,135 * 7/1999 Wasal et al. .......................... 523/161
6,086,955 * 7/2000 Mistry et al. ..................... 106/31.46
6,090,749 * 7/2000 Kowaiski ............................ 347/105
6,106,110 * 8/2000 Gundjian et al. ...................... 347/98
6,142,618 * 11/2000 Smith et al. .......................... 347/98

* cited by examiner

*Primary Examiner*—Eugene Eickholt

(57) ABSTRACT

A special ink consists of water and a humectant. A reusable paper includes a surface darkened by a water-insoluble material and a coating covering the darkened surface. The coating is made of a material that scatters light when dry and that becomes at least translucent when wetted by water. If the special ink is used to print on the reusable paper, the print will be visible for a limited period of time (e.g., half an hour). By the end of that time period, however, the special ink will have evaporated and the print will have disappeared completely from the reusable paper. The special ink may be applied to the reusable paper by an inkjet printer. An inkjet cartridge for such a printer includes a casing filled with the special ink.

20 Claims, 1 Drawing Sheet

INKING SYSTEM INCLUDING REUSABLE PAPER AND WATER-HUMECTANT INK

BACKGROUND OF THE INVENTION

The present invention relates to inking systems. More specifically, the present invention relates to ink, paper and an inkjet printer.

Widespread use of e-mail and the World Wide Web, many had hoped, would usher in a "paperless society." It hasn't. Many people still prefer to print out and read e-mail messages and web page content rather than read from computer monitors. What has been ushered in instead is a market for inexpensive ink jet printers. These inexpensive printers might not offer great print quality, but they do offer an inexpensive and convenient way of reading e-mail messages and web page content.

Unfortunately, much paper is wasted. Typically, a person will print out an e-mail message or web page content on one or more sheets of paper, read or show the message or content to someone else, and then throw away the paper.

If only the e-mail message or web page content could be erased from the paper after being read. A single sheet of paper could then be reused a countless number of times for printing out and reading e-mail messages and web page content. Paper could be conserved, and money could be saved.

SUMMARY OF THE INVENTION

According to one aspect of the present invention, a special ink is printed on a reusable paper. The special ink consists of water and a humectant. The reusable paper includes a surface darkened by a water-insoluble material and a coating covering the darkened surface. The coating is made of a material that scatters light when dry and that becomes at least translucent and at most transparent when wetted by water.

If the special ink is printed onto the reusable paper, it will be visible for a limited period of time (e.g., half an hour). By the end of that time period, however, the special ink will have completely disappeared from the reusable paper.

The special ink may be applied to the reusable paper by an inkjet printer. An inkjet cartridge for such a printer includes a casing filled with the special ink. Such a printer may be used to print out e-mail messages and web page content. After the e-mail messages and web page content have been read and have disappeared from the reusable paper, the reusable paper may be inserted back into the printer and reused.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
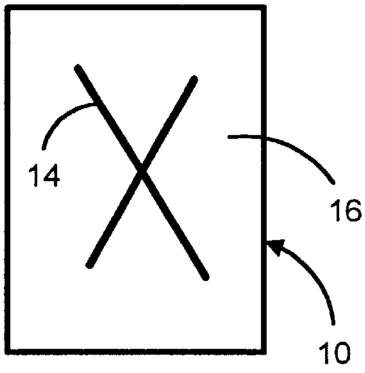
FIGS. 1 and 1A are illustrations of reusable paper.
Figure 1A:
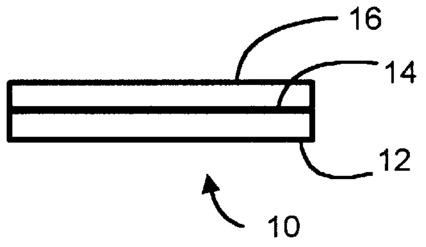

As shown in the drawings for purposes of illustration, the present invention is embodied in an inking system including a special ink and reusable paper. If the special ink is printed onto the reusable paper, it will be visible for a relatively short period of time (e.g., half an hour). By the end of that time period, however, the special ink will have disappeared completely from the reusable paper. The special ink may be applied to the reusable paper by an inkjet printer. Such an inkjet printer may be used to print out e-mail messages and web page content. After the e-mail messages and web page content have been read and have disappeared from the reusable paper, the reusable paper may be inserted back into the inkjet printer and reused. Paper would be conserved, and money would be saved.

Reference is made to FIG. 1, which shows a sheet of "special" paper 10. The reusable paper 10 includes a paper backing 12 having a surface 14 that is blackened or otherwise darkened by a water-insoluble material such as a black dye. The reusable paper 10 further includes a coating 16 covering the darkened surface. The coating 16 is made of a cellulose or other material that scatters light when dry and that becomes at translucent or even transparent when wetted by water. The coating 16 doesn't absorb the water quickly, which allows characters to be "etched" into the coating. Such reusable paper is commercially available. A supplier such as Tangent Toy Co. from Sausalito, Calif. sells reusable paper under the name "Mirage Art."

If pure water is applied to the coating 16 in an X-pattern as shown in FIG. 1, the water will cause the coating 16 to change properties and expose the underlying blackened surface 14. Thus, applying the water in the X-pattern will cause an X-like character to become visible.

The water evaporates from the coating 16. Pure water takes about thirty seconds to evaporate from the coating 16. Thus, an X-like character or other matter that is printed with pure water will be visible on the reusable paper 10 for about thirty seconds.

Mixing a humectant with the water can suppress or slow the evaporation of the water from the coating. Varying the weight percentage of the humectant can vary visibility time of the printed matter. The humectant may be ethylene glycol. For example, a 1:1 ratio (by weight) of ethylene glycol to water can increase the visibility time to about five minutes. A 3:1 ratio of ethylene glycol to water can further increase the visibility time to about thirty minutes. Thus, the water and humectant form a "special ink" that allows printed matter to remain visible long enough to be read.

Figure 2:
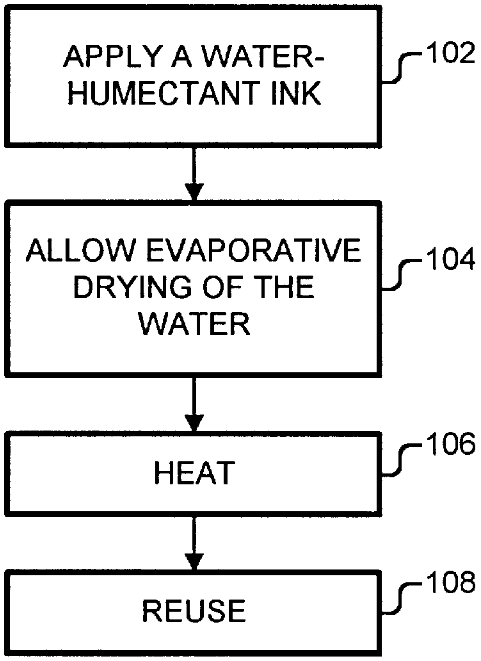
FIG. 2 is an illustration of a method of printing on the reusable paper.

FIG. 2 shows a method of printing with the special ink and the reusable paper. First the special ink is applied to the reusable paper (block 102). The ink may be applied as printed matter such as text, characters, images and line strokes. Additionally, the special ink may be applied by a variety of different instruments, such as brush; pen and inkjet printer.

After the special ink has been applied to the reusable paper, the water on the coating is allowed to evaporate (block 104). During evaporation of the water, printed matter will be visible and, therefore, readable.

After the printed matter has been read, the ink may be erased from the reusable paper by heating the reusable paper (block 104). The reusable paper may be heated in an oven. Heating the reusable paper greatly accelerates the evaporation of the water from the coating.

Even if heating is not performed, the water will eventually evaporate and the printed matter will disappear. After the printed matter has disappeared from the reusable paper, the reusable paper may be reused (block 108). If the special ink is applied to the reusable paper by a printer, the reusable paper may be reused by inserting it back into the printer.

Figure 3:
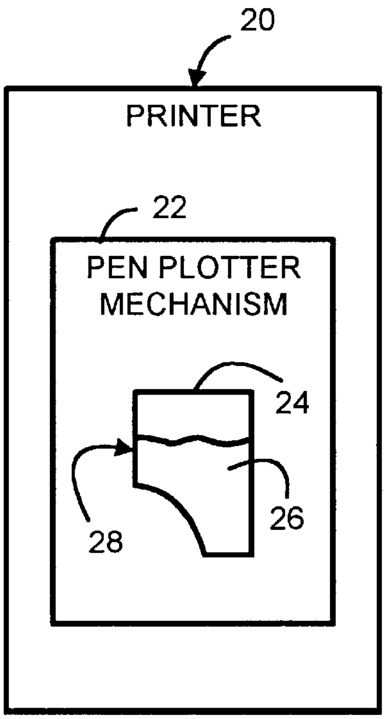
FIG. 3 is an illustration of a printer for printing on the reusable paper.

FIG. 3 shows a printer 20 for printing the special ink onto the reusable paper. The printer 20 includes a pen-plotter mechanism 22, an ink container 24 and special ink 26 contained within the container 24. If the printer 20 is an inkjet printer, the pen-plotter mechanism 22 will include a cartridge 28 having a casing 24 that contains the special ink 26.

A Hewlett-Packard 890 thermal inkjet printer has been used to print the special ink on the reusable paper. The cartridge of such a printer also includes a print head. During printing, the print head causes the ink to be boiled, and droplets of the ink to be ejected through hundreds of nozzles. Such a printer typically prints at a resolution of 300 dots per inch and delivers about 30 to 50 picoliters per drop. An inkjet cartridge for the Hewlett-Packard 890 inkjet printer was filled with the special ink. The special ink had a 3:1 percentage weight ratio of ethylene glycol to water, and the printed matter was visible for about half an hour. Quality of the printed matter was acceptable.

There is no limitation as to how the special ink and reusable paper are used. Printing out e-mail messages and web pages are but two examples. Use as a scratch pad is another example. The combination of special ink and reusable paper may be used for any printed matter that should be visible for a relatively short period of time.

The special ink is not limited to a humectant such as ethylene glycol. Any substance that suppresses the evaporation of the water may be used as the humectant. Moreover, the relative amounts of water and humectant may be adjusted to control the period of time that the special ink is visible. Thirty minutes should provide an adequate visibility time to read e-mail messages, web page content and other printable matter Accordingly, the invention is not limited to the specific embodiments described and illustrated above. Instead, the invention is construed according to the claims that follow.

What is claimed is:

1. A method of printing on a reusable paper, the reusable paper including a surface darkened by a water-insoluble material and a coating covering the darkened surface, the coating being made of a material that scatters light when dry and that becomes at least translucent and at most transparent when wetted by water, the method comprising the steps of:

applying an ink consisting of water and a humectant to the coating; and allowing the water on the coating to evaporate;

whereby the humectant suppresses the evaporation of the water on the coating.

2. The method of claim 1, further comprising the step of applying additional ink after the water has evaporated from the coating, whereby the paper is reused.

3. The method of claim 1, further comprising the step of heating the paper to accelerate the evaporation of the water on the coating, whereby heating the paper causes the ink to be erased.

4. The method of claim 1, wherein a printer including a pen-plotter mechanism is used to apply the ink to the coating.

5. The method of claim 1, wherein an inkjet printer is used to apply the ink to the coating.

6. A combination comprising:

reusable paper including a surface darkened by a water-insoluble material and a coating covering the darkened surface, the coating being made of a material that scatters light when dry and that becomes at least translucent when wetted by water; and ink for the reusable paper, the ink consisting of water and a humectant.

7. The combination of claim 6, wherein the humectant includes ethylene glycol.

8. The combination of claim 7, wherein a weight ratio of the humectant to the water is greater than 1:1.

9. The combination of claim 7, wherein a weight ratio of the humectant to the water is greater than 3:1.

10. A cartridge for an inkjet printer, the cartridge comprising:

a casing; and an ink contained within the casing, the ink consisting of water and a humectant.

11. The cartridge of claim 10, wherein the humectant includes ethylene glycol.

12. The cartridge of claim 11, wherein a weight ratio of the humectant to the water is greater than 1:1.

13. The cartridge of claim 11, wherein a weight ratio of the humectant to the water is greater than 3:1.

14. A printer comprising:

a pen-plotter mechanism;

an ink container; and ink contained within the container, the ink consisting of water and a humectant.

15. The printer of claim 14, wherein the humectant includes ethylene glycol.

16. The printer of claim 15, wherein a weight ratio of the humectant to the water is greater than 1:1.

17. An ink for an inkjet printer, the ink consisting of:

water; and a humectant.

18. The ink of claim 17, wherein the humectant includes ethylene glycol.

19. The ink of claim 18, wherein a weight ratio of the humectant to the water is greater than 1:1.

20. The ink of claim 18, wherein a weight ratio of the humectant to the water is greater than 3:1.

* * * * *